United States Patent
Mountain

(10) Patent No.: US 7,631,854 B1
(45) Date of Patent: Dec. 15, 2009

(54) HORIZONTAL BICYCLE STORAGE HOIST

(76) Inventor: Andrew Mountain, 21638 Murray's Crescent, Langley, British Columbia (CA) V3A 8N2

( * ) Notice: Subject to any disclaimer, the term of this patent is extended or adjusted under 35 U.S.C. 154(b) by 0 days.

(21) Appl. No.: 12/380,140

(22) Filed: Feb. 23, 2009

(51) Int. Cl.
 B66D 3/04 (2006.01)
 A47F 7/00 (2006.01)
 A47H 1/10 (2006.01)

(52) U.S. Cl. .......................... 254/390; 254/394; 211/17; 248/317; 248/332

(58) Field of Classification Search ................ 254/390, 254/391, 399, 394, 395, 396, 415, 380, 283, 254/284, 286; 212/179; 211/17; 248/317, 248/332, 346.01, 678, 191.1; 160/352, 84.01
See application file for complete search history.

(56) References Cited

U.S. PATENT DOCUMENTS

| | | | |
|---|---|---|---|
| 3,872,972 A * | 3/1975 | Cummins et al. ............. | 211/17 |
| 3,924,751 A * | 12/1975 | Ballenger .................... | 211/17 |
| 4,116,341 A | 9/1978 | Hebda | |
| 5,354,035 A * | 10/1994 | Helgren ...................... | 254/399 |
| 5,460,274 A | 10/1995 | Kramer | |
| 5,474,189 A * | 12/1995 | Peterson ...................... | 211/18 |
| 5,664,687 A | 9/1997 | Liatti | |
| 5,848,708 A | 12/1998 | Edwards | |
| 6,095,344 A * | 8/2000 | White ......................... | 211/17 |
| 6,161,702 A * | 12/2000 | Campbell .................... | 211/17 |
| 6,662,847 B1 * | 12/2003 | Squibb et al. ............ | 160/84.01 |
| 7,150,449 B1 * | 12/2006 | Dueck et al. ................ | 254/278 |
| 7,325,785 B2 * | 2/2008 | Krengel et al. ............. | 254/338 |
| 2002/0175254 A1 * | 11/2002 | Lee ........................ | 248/289.11 |
| 2006/0120846 A1 * | 6/2006 | Krengel et al. ............. | 414/592 |
| 2008/0308778 A1 * | 12/2008 | Krengel et al. ............. | 254/338 |

FOREIGN PATENT DOCUMENTS

| | | |
|---|---|---|
| DE | 8907725 | 9/1989 |
| DE | 29711182 | 9/1997 |

* cited by examiner

*Primary Examiner*—Evan H Langdon

(57) ABSTRACT

A ceiling-mounted bicycle storage hoist including a first elongated structural member (36) and a second elongated structural member (38). The first elongated structural member is connected to the second elongated structural member, forming a V-shaped structural assembly spanning at least 1220 mm in one direction, to enable attachment to ceilings comprising wooden joists spaced at 305 mm, 406 mm, 488 mm, or 610 mm intervals. A first, second, and third rope and pulley system are attached to the first and second elongated structural members. The first, second, and third rope and pulley systems converge at a location near the connection between the first and second elongated structural members, enabling a user to control the first, second, and third rope and pulley systems simultaneously. A bicycle may be attached to the first, second, and third rope and pulley systems and hoisted in a horizontal orientation.

2 Claims, 18 Drawing Sheets

HORIZONTAL BICYCLE STORAGE HOIST

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to bicycle storage racks and devices, specifically to a ceiling-mounted device for hoisting a bicycle in a horizontal orientation.

2. Prior Art

There are currently about one billion bicycles worldwide. Bicycle storage is an important problem. It is desirable to relieve the garage space, living space, or storage space in a room, such as a garage or interior room of a dwelling, for the normal utility to which such structures are intended. It would be further desirable to provide storage means for one or more bicycles within a room, but without, at the same time, utilizing floor space otherwise needed for living space or the storage of automobiles, or wall space otherwise needed for placement of shelving and other items. In order to store a bicycle elevated off the ground, and in a position sufficiently distant from a wall, it is most advantageous to orient the bicycle horizontally so that persons and tall automobiles may pass freely below the bicycle.

A wide variety of bicycle storage devices have been designed and bicycle storage systems, or bicycle lifting systems, are common in a market. However, all of the systems available in the market maintain a bicycle in a vertical orientation. German patent 8,907,725 to Konig & Meyer Gmbh (1989) discloses a rope and pulley device that lifts a bicycle in a vertical orientation. If such a device is used in a room with a ceiling height of less than approximately 3.3 m, persons and tall automobiles are unable to pass freely below a stored bicycle.

Several bicycle storage devices that maintain a bicycle in a horizontal orientation have been designed. Among them, the simplest are devices that allow a bicycle to hang from three hooks mounted to a ceiling. U.S. Pat. No. 5,460,274 to Kramer (1995) discloses a bicycle suspension system in which a bicycle is held by three hooks—two hooks holding the base of each wheel and one hook holding the top tube of the bicycle. U.S. Pat. No. 5,848,708 to Edwards (1998) discloses a similar system, but instead of engaging the top tube of the bicycle, the hook engages with a bracket installed between the handlebar and top tube of the bicycle. These designs are not convenient or safe to use. The user must first lift the bicycle above their head to engage the front and rear wheels with the hooks, then the user must scale a ladder to swing the bicycle up to a horizontal orientation.

Another type of device has a bicycle mounted to a frame that is hinged to the ceiling, allowing the frame to pivot from a vertical orientation to a horizontal orientation. U.S. Pat. No. 4,116,341 to Hebda (1978) discloses a frame to which a bike is attached, which is then manually rotated from vertical to horizontal orientation. U.S. Pat. No. 5,664,687 to Liatti (1997), and U.S. Pat. No. 6,095,344 to White (2000) disclose similar devices that utilize spring force to rotate the frame. Hebda's manually-powered design is inconvenient and difficult to use because the user must scale a ladder to lift the frame to the horizontal orientation. The spring-powered designs require large and elaborate mechanisms to allow the spring force to be applied to the frame, therefore, they are not ideal for purposes of simplicity and inexpensiveness.

Still another type of device suspends a bicycle from a ceiling in a horizontal orientation using rope and pulley systems. U.S. Pat. No. 3,872,972 to Cummins (1975) discloses a multi-rope device comprising lengths of rectangular tubing fixed to the ceiling in a U-shape. Pulleys are attached to the tubing at various locations to allow the ropes to be connected to the bicycle seat, handlebar, and down tube. This design consumes a large amount of ceiling area, must be installed close to a wall so the ropes can be anchored to it, employs a bulky sandbag for counterweight, and lacks rope locking devices for safety. U.S. Pat. No. 5,354,035 to Helgren (1994) discloses a single-rope device in which three short ropes branch out to attach to a bicycle fork, seat stay, and top tube. The bicycle is initially lifted in a vertical orientation, then is automatically shifted to a horizontal orientation as it ascends. Because the rope branches from a single point into three points, the bicycle is held lower than if three separate ropes were used. This design stores a bicycle no higher above the floor than does a typical vertical lifting bicycle storage system. German patent 29,711,182 to Klausner (1997) discloses a device that comprising three spools of different diameters connected to a long bar that is rotated by a motorized unit. Ropes that wind around the spools are connected to a bicycle handlebar, seat, and crank. Because the spools are different diameters, the bicycle rotates automatically from vertical to horizontal orientation as it ascends. This design has several disadvantages. First, in order for the bicycle to come to rest at a perfectly horizontal orientation near the ceiling, the spool diameters must be customized to suit the ceiling height of the room. Second, when the bicycle is lifted to the maximum height, the rope angles become acute, increasing the force applied to the bicycle. Finally, because this system is motorized, it is not ideal for purposes of simplicity and inexpensiveness.

Therefore, there is a long felt, but unsatisfied need for the invention while the needed implementing arts and elements had long been available. When a device such as a bicycle storage system is designed for use, it must satisfy the common requirements for, first of all, simplicity; second, convenience; third, safety; fourth, easy installation; and fifth, adaptability to any size or shape of bicycle.

3. Objects and Advantages

Accordingly, several objects and advantages of my ceiling-mounted bicycle storage hoist are:

(a) to provide a ceiling-mounted bicycle storage hoist that lifts and maintains a bicycle in a horizontal orientation;

(b) to provide a ceiling-mounted bicycle storage hoist that may be installed on many common ceiling structures, such as concrete ceilings, or wooden joist ceilings with joists spacings of 305 mm, 406 mm, 488 mm or 610 mm without the need for additional structures such as wooden boards to be applied to the ceiling (FIGS. 3A to 3H);

(c) to provide a ceiling-mounted bicycle storage hoist that may be installed in any one of two possible orientations on a wooden joist ceiling with joist spacings of 305 mm, 406 mm, 488 mm or 610 mm (FIGS. 3A to 3H);

(d) to provide a ceiling-mounted bicycle storage hoist that comprises as few elongated structural members as possible;

(e) to provide a ceiling-mounted bicycle storage hoist that comprises elongated structural members that are as short as possible;

(f) to provide a ceiling-mounted bicycle storage hoist that does not require installation nearby a wall, or require components to be installed on a nearby wall;

(g) to provide a ceiling-mounted bicycle storage hoist that is safe and convenient to use by incorporating rope and pulley systems with rope locking devices;

(h) to provide a ceiling-mounted bicycle storage hoist that comprises three separate rope and pulley systems for maximum control of the attitude of a bicycle so it may be stored in close proximity to the ceiling;

(i) to provide a ceiling-mounted bicycle storage hoist that is able to store a wide range of bicycle shapes and sizes by incorporating pulleys that are able to accommodate acute rope angles;

Still further objects and advantages will become apparent from a consideration of the ensuing description and drawings.

SUMMARY

A ceiling-mounted bicycle storage hoist and method for lifting a bicycle above the ground in a horizontal orientation in an enclosure such as a garage, or interior room of a dwelling, comprises three rope and pulley systems connected to two elongated structural members. The two elongated structural members are arranged substantially perpendicular to each other and joined together, forming a V-shaped structural assembly.

DRAWINGS

DETAILED DESCRIPTION

Figure 4A:
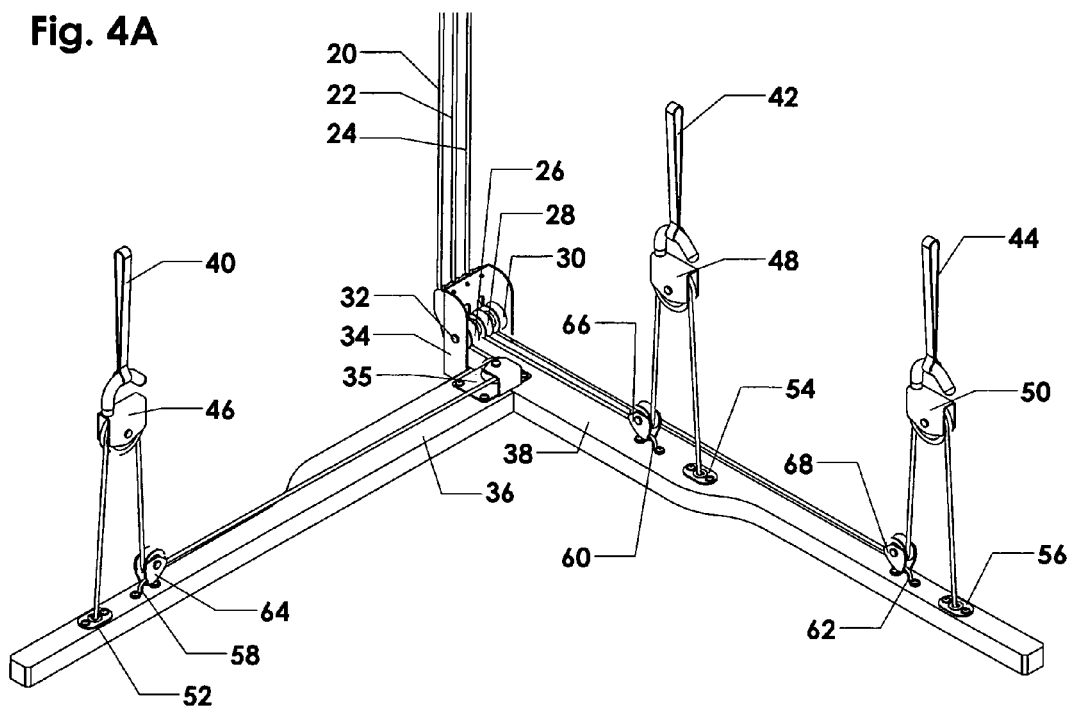
FIGS. 4A and 4B show a storage hoist with cleat rope locking devices, a redirect pulley, and three pulley systems incorporating one moveable pulley each.
Figure 4B:
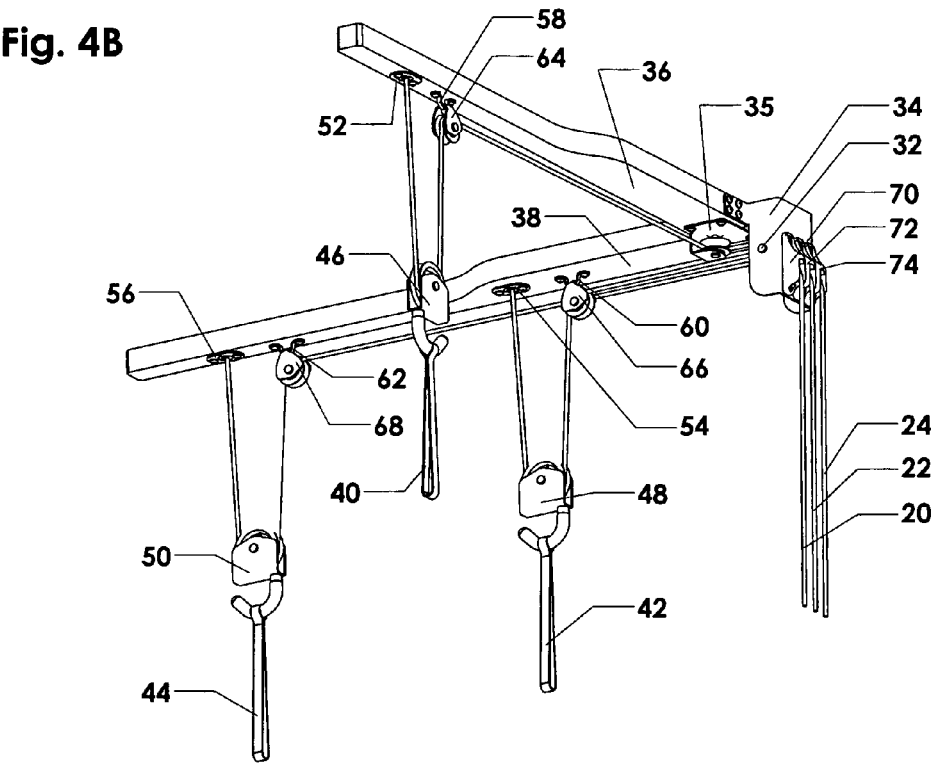

FIGS. 4A AND 4B—Preferred Embodiment

A preferred embodiment of the storage hoist of the present invention is illustrated in FIGS. 4A and 4B. The storage hoist has two elongated structural members 36 and 38, on which all other components are attached. Elongated structural member 36 is typically 860 mm long. Elongated structural member 38 is typically 980 mm long. Elongated structural members 36 and 38 are typically 30 mm thick, consisting of LVB (laminated veneer board) or LVL (laminated veneer lumber). Rope lock assembly 34 is connected to the side of elongated structural member 36 with four wood screws and to the side of elongated structural member 38 with four wood screws, resulting in elongated structural member 36 arranged substantially perpendicular to elongated structural member 38, forming a V-shaped structural assembly. The redirect pulley 35 is connected to the top of elongated structural member 36 with two wood screws and to the top of elongated structural member 38 with two wood screws.

An eye strap 58 is attached to elongated structural member 36 with two wood screws. Fixed pulley 64 is engaged with eye strap 58, and therefore pivotally connected to elongated structural member 36. Plate 52 is attached to elongated structural member 36 with two wood screws. In a similar fashion, an eye strap 60 is attached to elongated structural member 38 with two wood screws. Fixed pulley 66 is engaged with eye strap 60, and therefore pivotally connected to elongated structural member 38. Plate 54 is attached to elongated structural member 38 with two wood screws. Likewise, an eye strap 62 is attached to elongated structural member 38 with two wood screws. Fixed pulley 68 is engaged with eye strap 62, and therefore pivotally connected to elongated structural member 38. Plate 56 is attached to elongated structural member 38 with two wood screws.

A pin 32 passes through the rope lock assembly 34, on which pulley wheels 26, 28, and 30 are rotatably mounted. Three cleat rope locking devices 70, 72, and 74 are attached to the rope lock assembly 34 with tapping screws. The cleat rope locking devices used in the preferred embodiment are the CL203 available from Clamcleats Limited of Welwyn Garden City, England.

Rope 20 passes through cleat rope locking device 70 and through a hole in the rope lock assembly 34 typically 28 mm tall and 12 mm wide. Rope 20 then passes over pulley wheel 26, then through redirect pulley 35 so that rope 20 is redirected from substantially perpendicular to substantially parallel to the longitudinal axis of elongated structural member 36. Rope 20 then passes through fixed pulley 64, then through moveable pulley 46, then through the central hole in plate 52. A knot is tied in the end of rope 20 to connect it to the plate 52.

Rope 22 passes through cleat rope locking device 72 and through a hole in the rope lock assembly 34 typically 28 mm tall and 12 mm wide. Rope 22 then passes over pulley wheel 28, then through fixed pulley 66, then through moveable pulley 48, then through the central hole in plate 54. A knot is tied in the end of rope 22 to connect it to the plate 54. Rope 24 passes through rope locking device 74 and through a hole in the rope lock assembly 34 typically 28 mm tall and 12 mm wide. Rope 24 then passes over pulley wheel 30, then through fixed pulley 68, then through moveable pulley 50, then through the central hole in plate 56. A knot is tied in the end of rope 24 to connect it to the plate 56.

Figure 5:
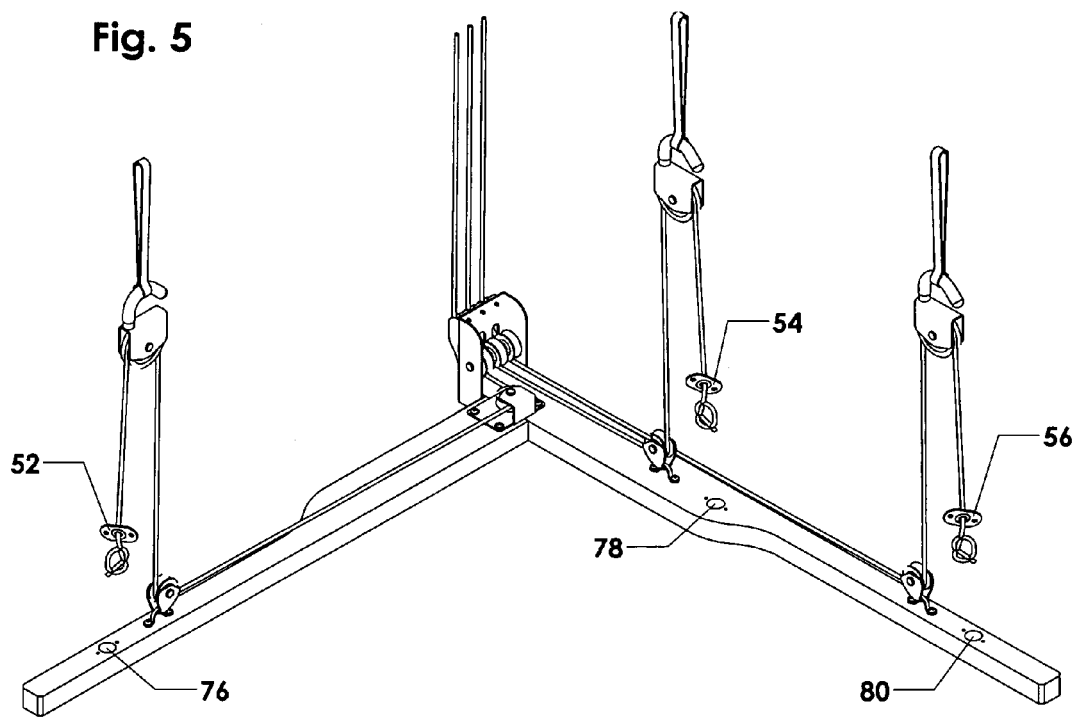
FIG. 5 shows three clearance holes in elongated structural members of a storage hoist.
Figure 6:
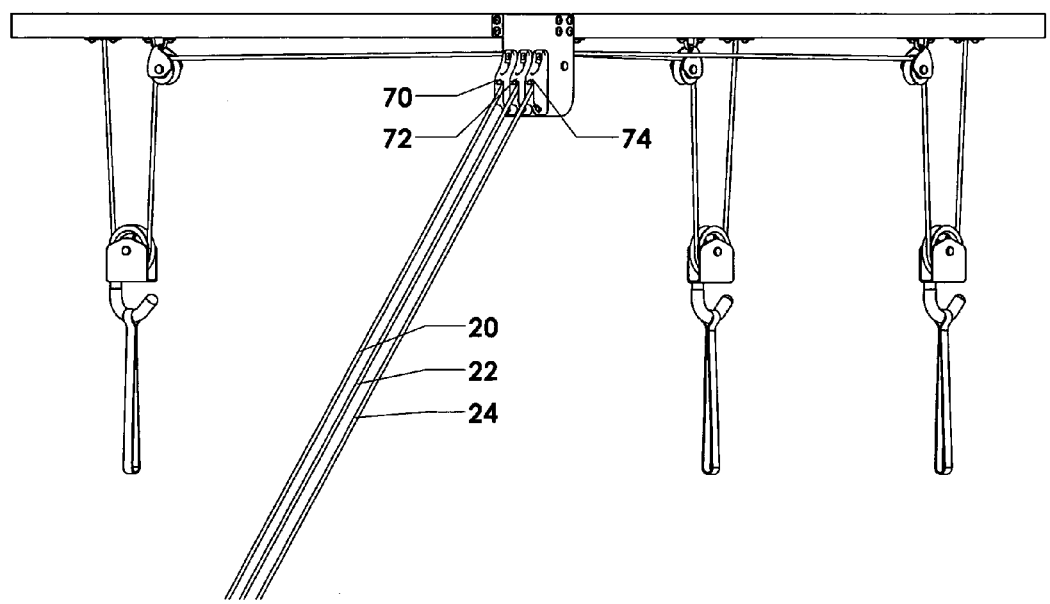
FIG. 6 shows ropes elevated to a position in which they are disengaged from the cleat rope locking devices.

To provide clearance for the knots tied in the end of ropes 20, 22, and 24, clearance holes 76, 78, and 80, typically 22 mm in diameter and 25 mm deep, are located concentric to the central holes in plates 52, 54, and 56 (FIG. 5).

As shown in FIGS. 4A and 4B, moveable pulleys 46, 48, and 50 comprise flanges on which a hook is welded. To prevent a moveable pulley from inverting, the hook typically must weigh at least 120 grams, and therefore, in the preferred embodiment, comprises of 14 mm steel round bar. The diameter of a pulley wheel contained in a movable pulley is typically 65 mm. This diameter is large enough to sufficiently resist the tendency for the ropes to twist around each other. Slings 40, 42, and 44 are placed on the moveable pulleys 46, 48, and 50 to allow attachment to the bicycle frame. The slings are typically 200 mm long to allow attachment to bicycle frame diameters as large as 50 mm. The mechanical advantage of each rope and pulley system is 2.

Operation—FIGS. 1, 2, 6, 7, 8A, 8B

Figure 1:
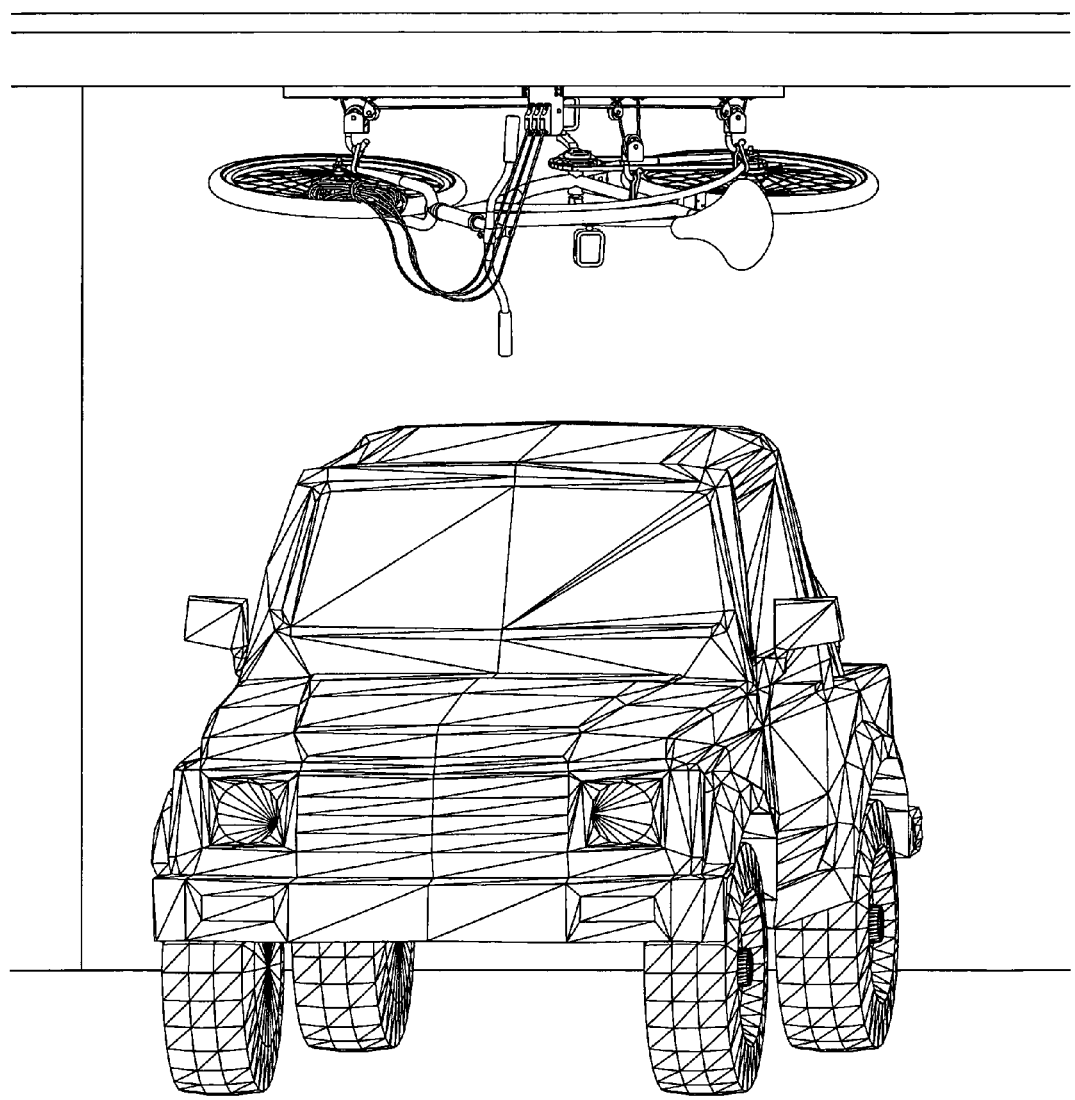
FIG. 1 shows a storage hoist maintaining a bicycle in a raised position in a garage setting above an automobile.
Figure 2:
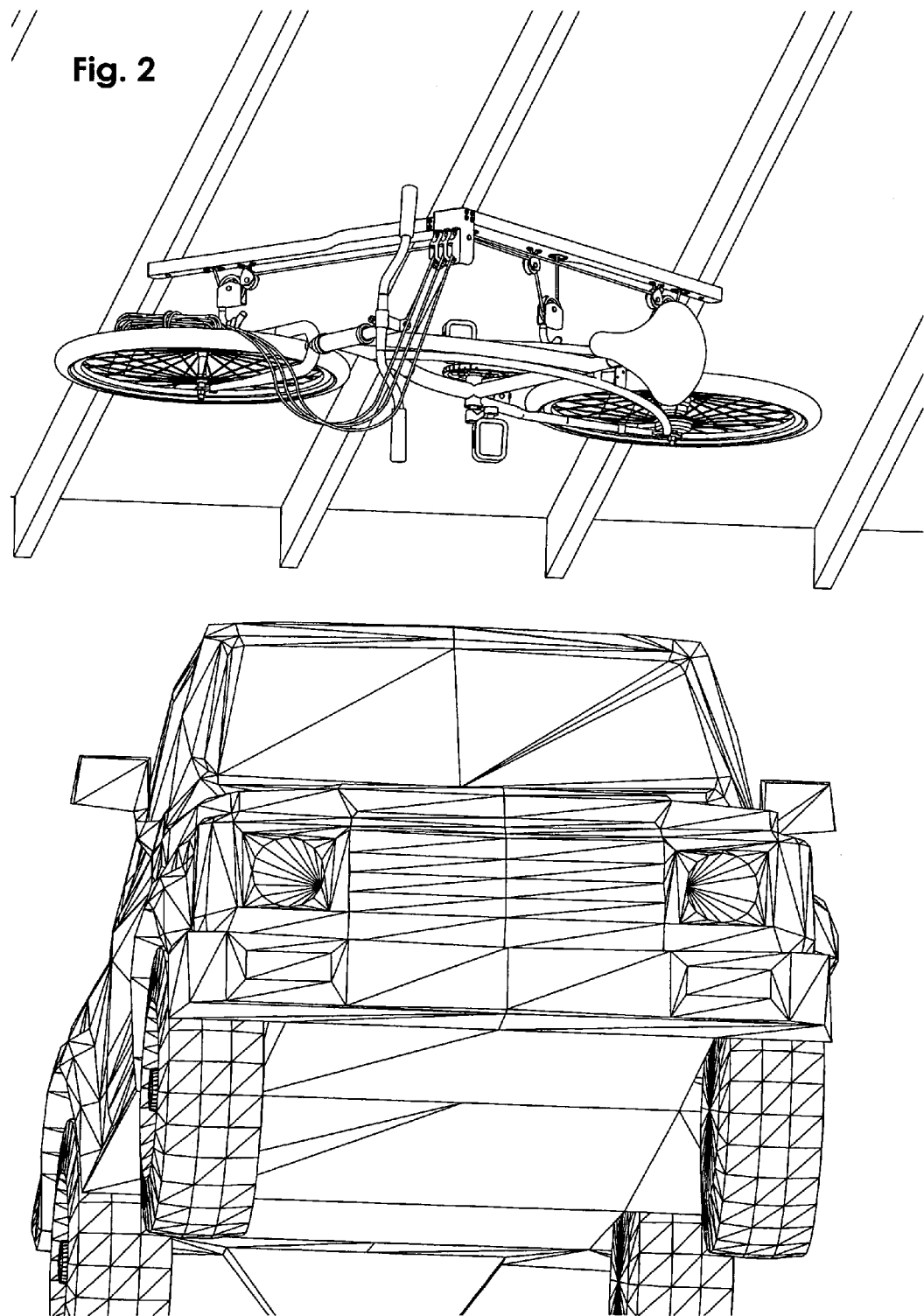
FIG. 2 shows a storage hoist installed on a wooden joist ceiling with a joist spacing of 610 mm, maintaining a bicycle in a raised position in a garage setting above an automobile.
Figure 3A:
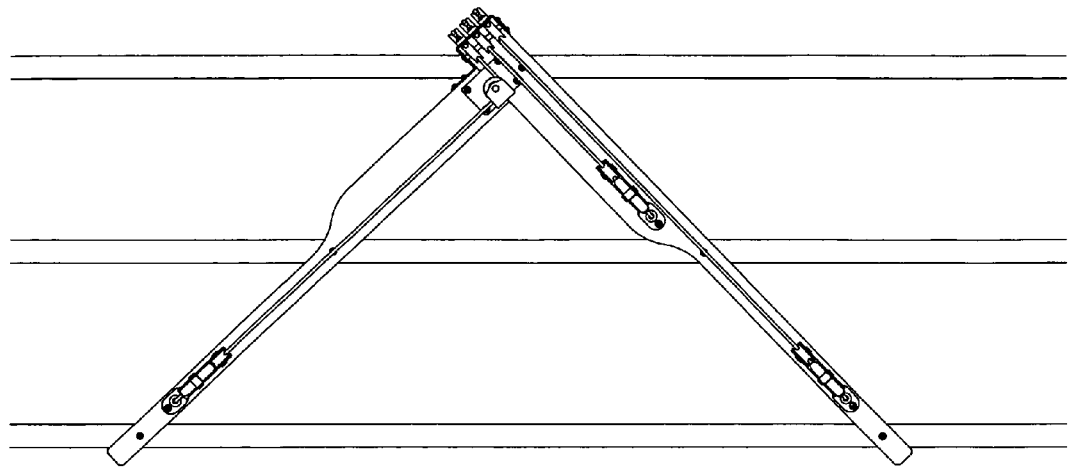
FIGS. 3A and 3B show storage hoists installed on wooden joist ceilings with joist spacings of 305 mm.
Figure 3B:
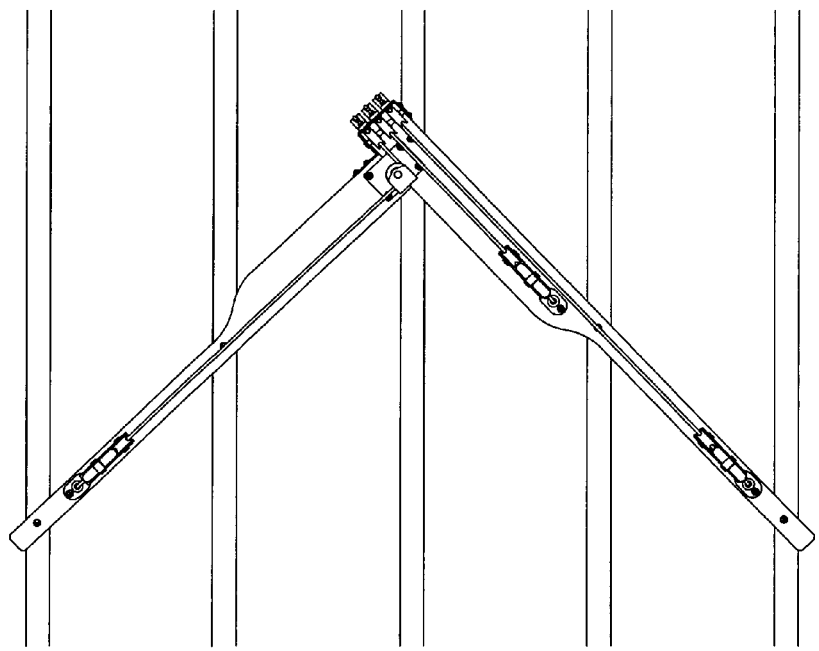
Figure 3C:
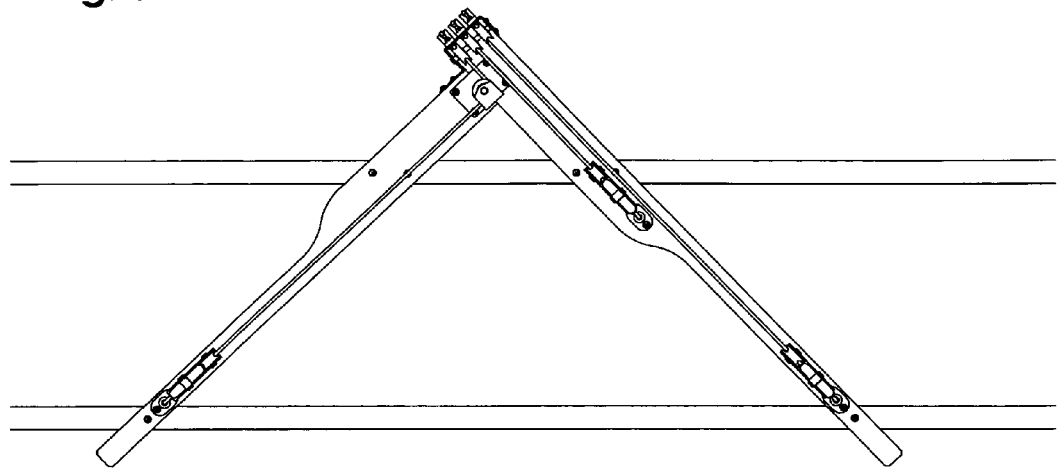
FIGS. 3C and 3D show storage hoists installed on wooden joist ceilings with joist spacings of 406 mm.
Figure 3D:
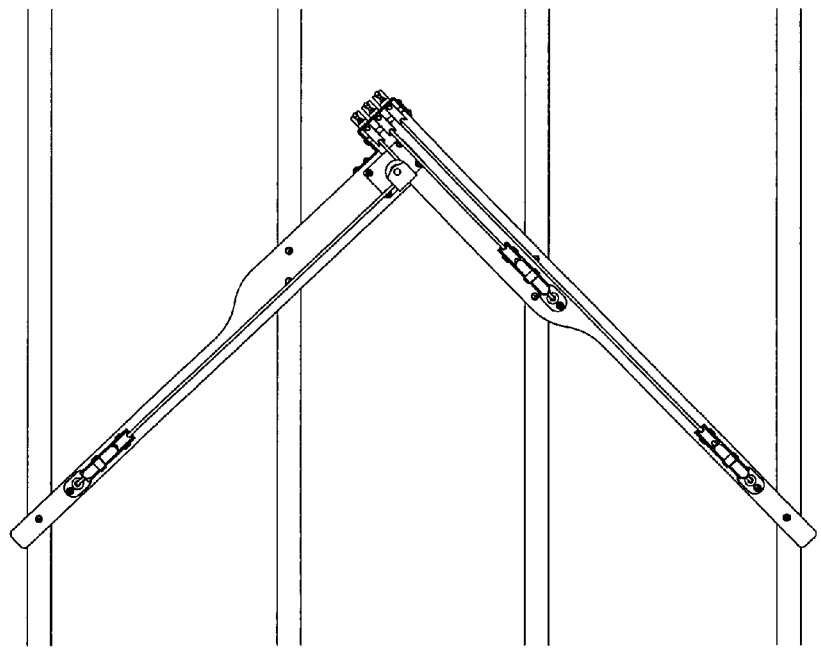
Figure 3E:
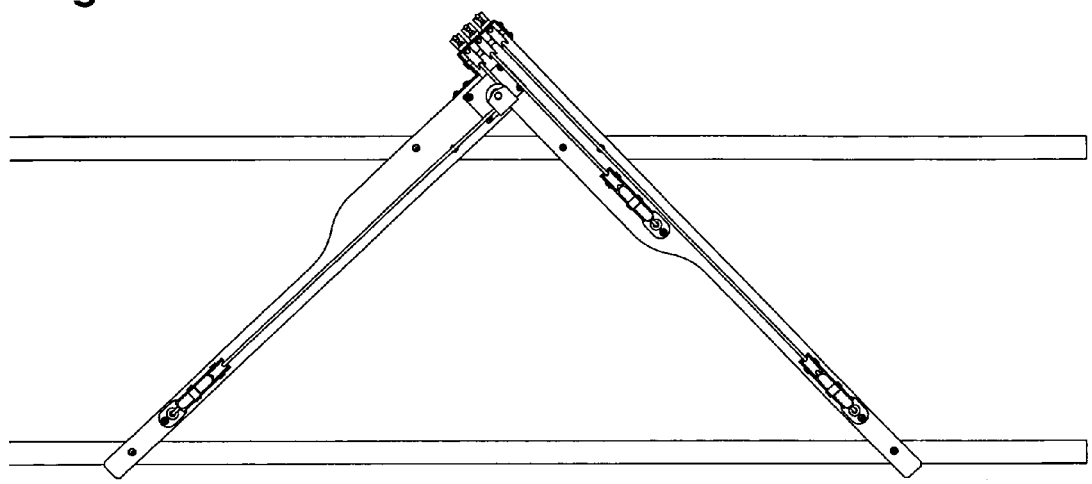
FIGS. 3E and 3F show storage hoists installed on wooden joist ceilings with joist spacings of 488 mm.
Figure 3F:
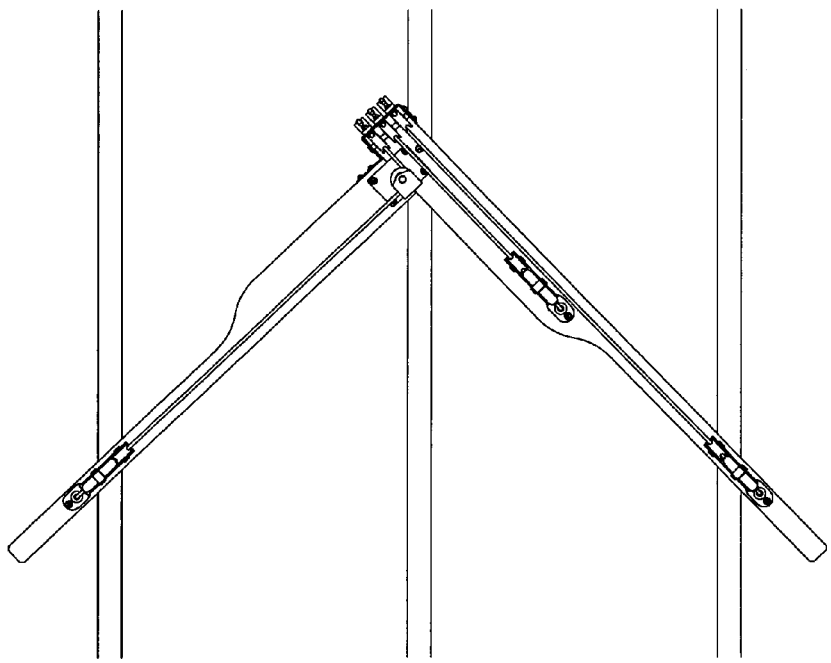
Figure 3G:
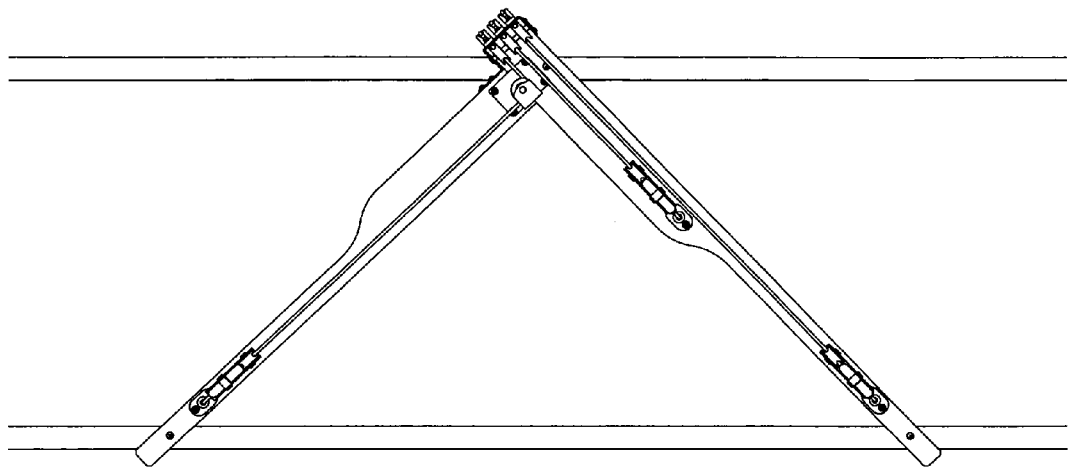
FIGS. 3G and 3H show storage hoists installed on wooden joist ceilings with joist spacings of 610 mm.
Figure 3H:
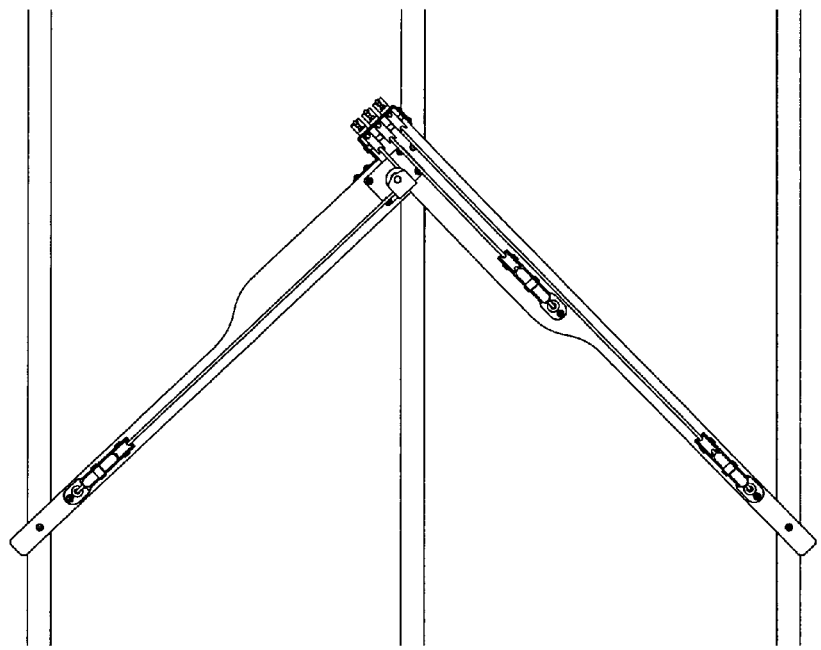
Figure 7:
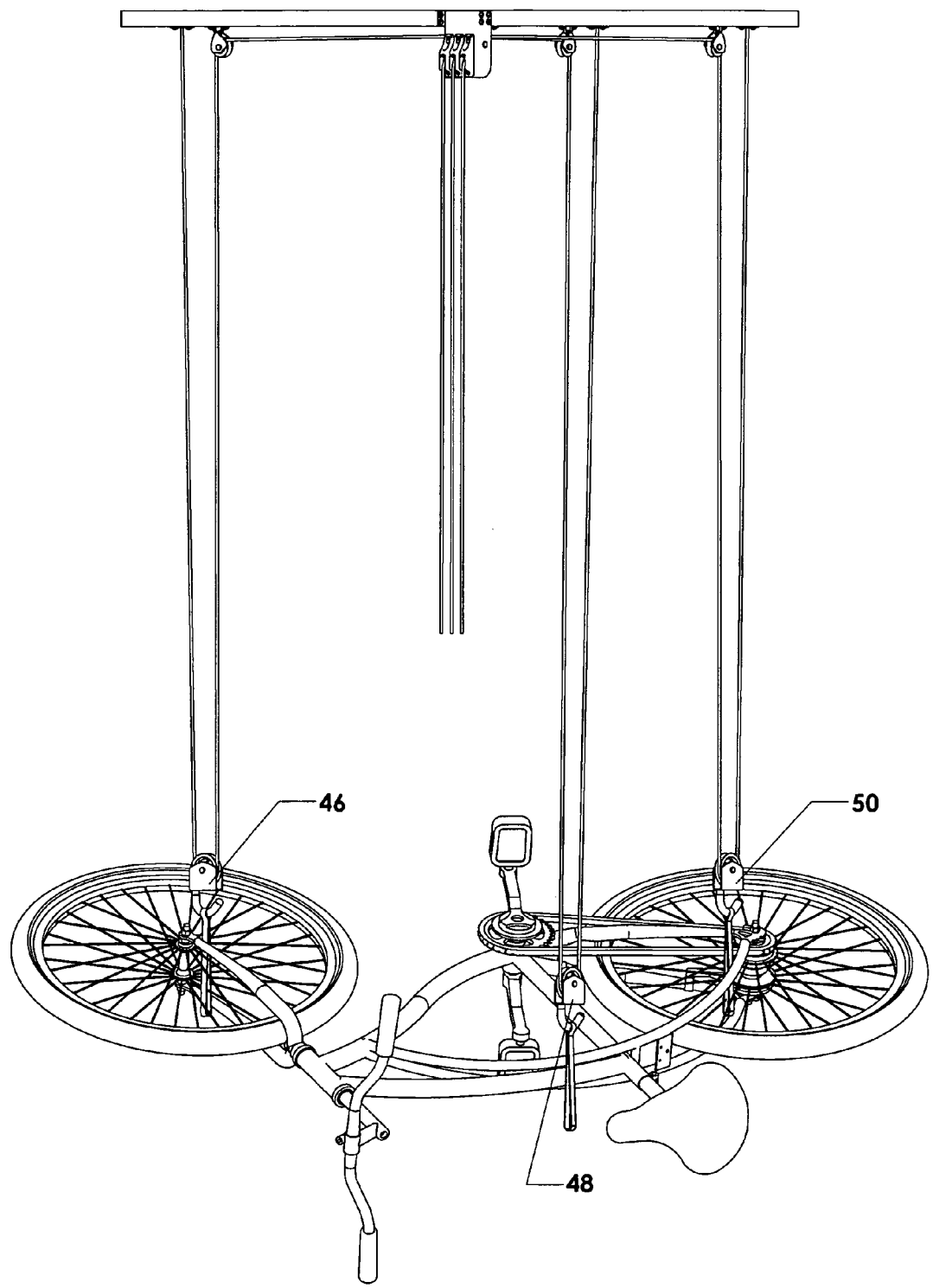
FIG. 7 shows a storage hoist with movable pulleys in a lowered position, and a bicycle laying on a floor in an orientation suitable for attachment of the bicycle to the rope and pulley systems.
Figure 8A:
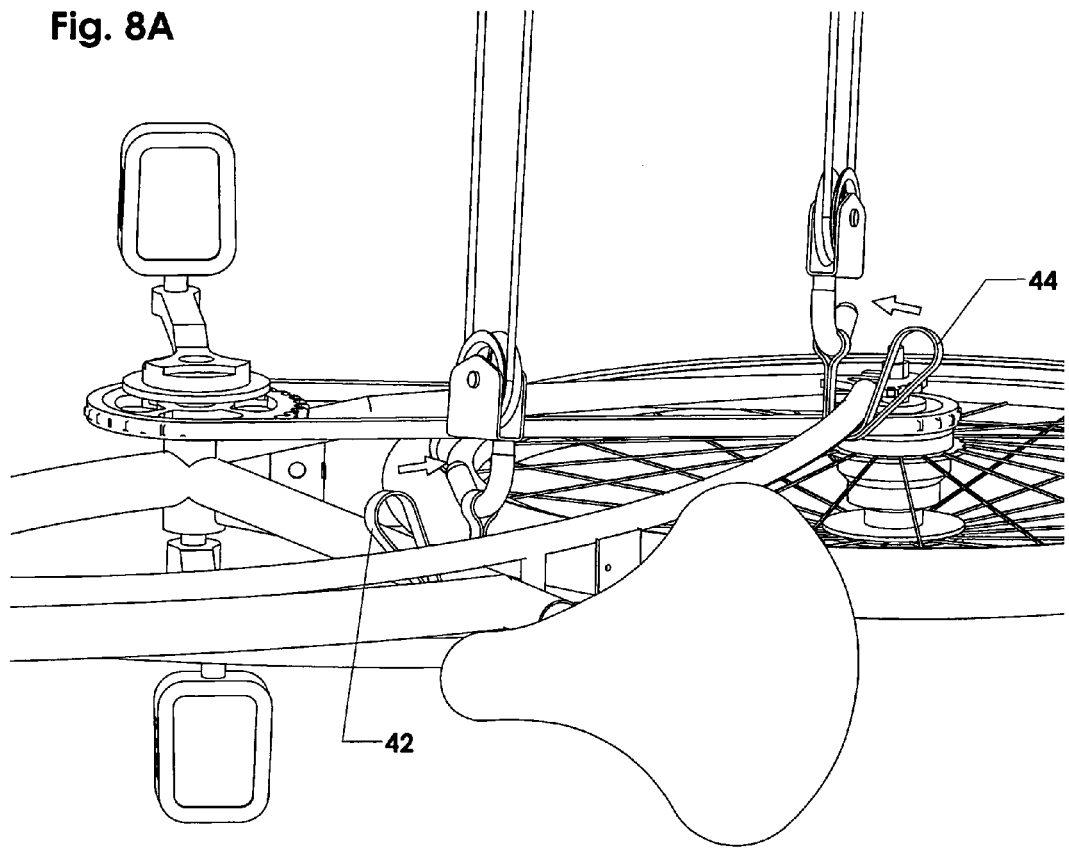
FIGS. 8A and 8B show the process of attaching a bicycle to the rope and pulley systems using slings.
Figure 8B:
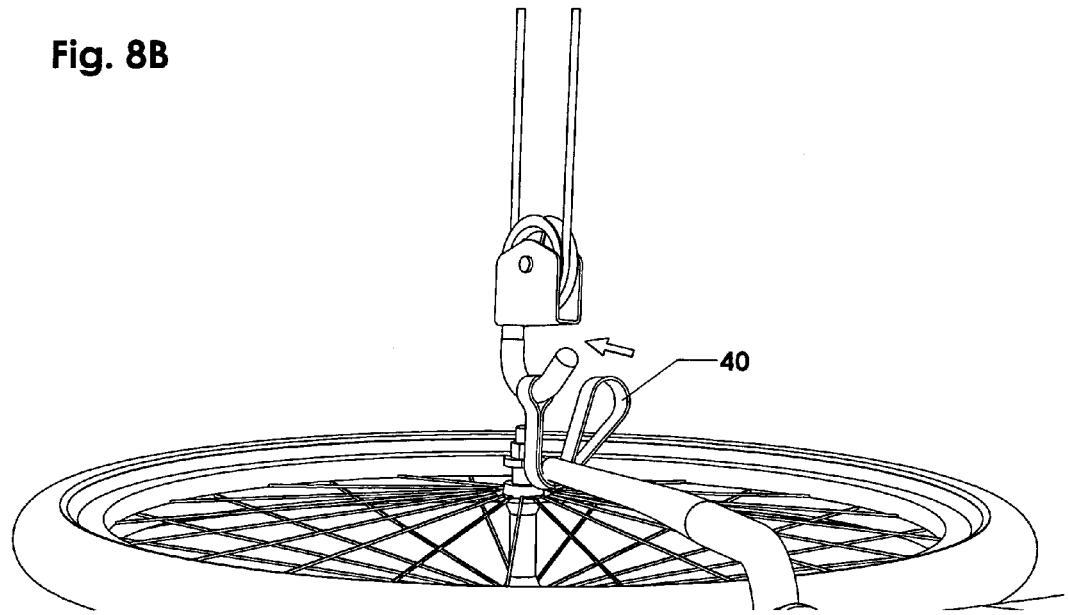

To use the storage hoist, one first lays a bicycle down on the floor directly below the storage hoist in an orientation similar to the one depicted in FIG. 7. Next one raises ropes 20, 22, and 24 to an elevated position (FIG. 6) in order to release the ropes from the cleat rope locking devices 70, 72, and 74. Next, one allows moveable pulleys 46, 48, and 50 to descend until they come in close proximity to a bicycle (FIG. 7). Next, one attaches the bicycle to the pulley systems using slings 40, 42, and 44 (FIGS. 8A and 8B). Next, one pulls down on ropes 20, 22 and 24 simultaneously to raise the bicycle to a stored position, as close to the ceiling as possible. Next, one gathers the ropes into a single bundle and places it on the front or rear tire of the bicycle (FIGS. 1 and 2).

To lower the bicycle, one first retrieves the bundle of rope from the front or rear tire of the bicycle. Next, one raises ropes 20, 22 and 24 to an elevated position (FIG. 6) in order to release the ropes from the cleat rope locking devices 70, 72, and 74. Next, one allows the bicycle to slowly descend to the floor by allowing ropes 20, 22 and 24 to pass through one's hands in a controlled manner. Next one disconnects the bicycle from slings 40, 42 and 44. Next one raises movable pulleys 46, 48, and 50 close to the ceiling so that they will not interfere with persons and objects passing below the storage hoist.

Figure 9A:
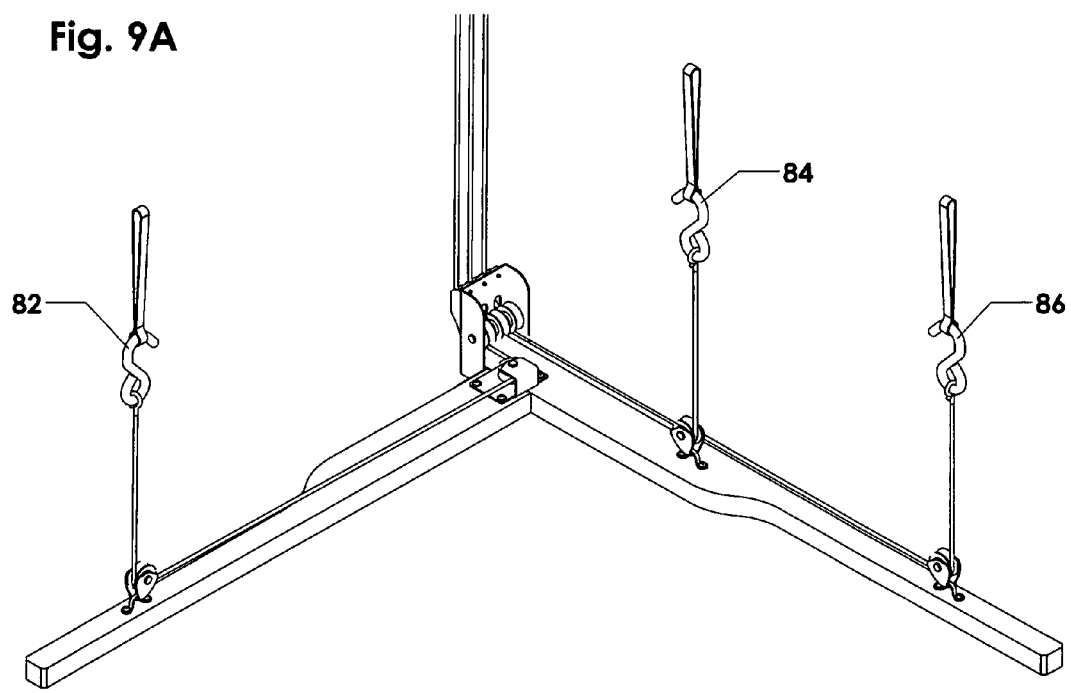
FIGS. 9A and 9B show a storage hoist with rope and pulley systems having mechanical advantages of 1.
Figure 9B:
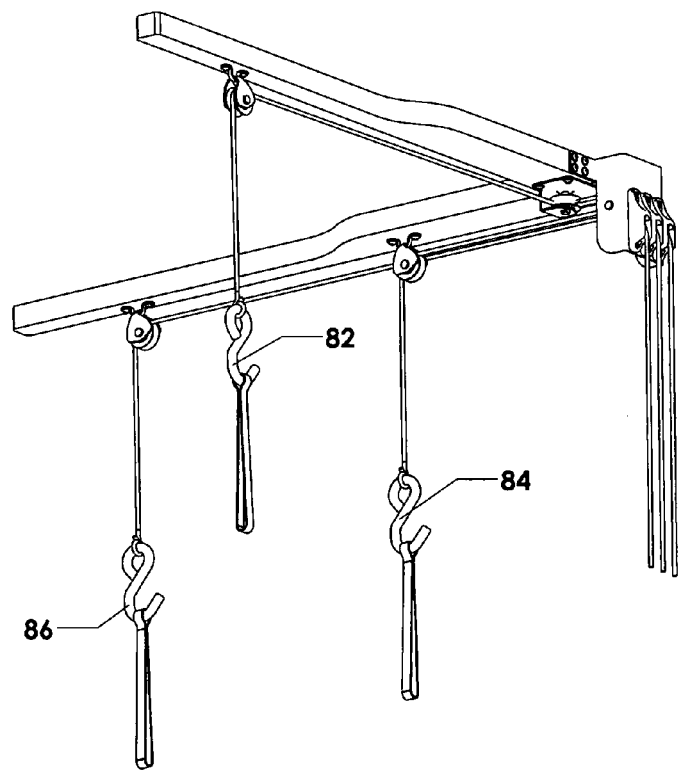

FIGS. 9A and 9B—Additional Embodiment

An additional embodiment is shown in FIGS. 9A and 9B; in this case, the moveable pulleys and plates are absent. Instead of passing through moveable pulleys, the ropes are attached directly to rubber coated steel S-hooks 82, 84, and 86. S-hooks weighing more than 120 grams are desirable to increase the ease of their downward movement when no load is attached. The mechanical advantage of each rope and pulley system is 1. This embodiment is more cost effective to manufacture than the preferred embodiment, however, only relatively light bicycles weighing less than about 13 kg can be comfortably lifted by most persons.

Figure 12A:
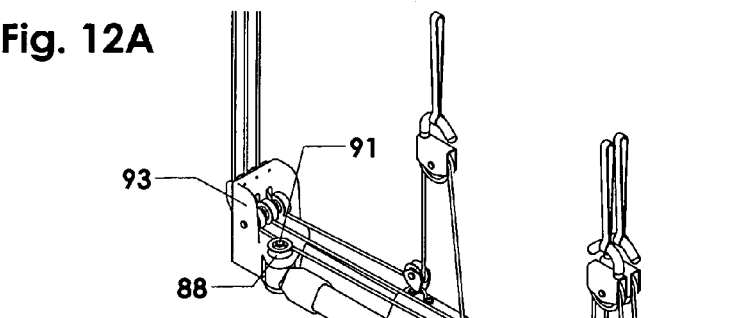
FIGS. 12A to 12C show a storage hoist with elongated structural members consisting of tubular aluminum, to which a plurality of molded plastic components are mounted.
Figure 12B:
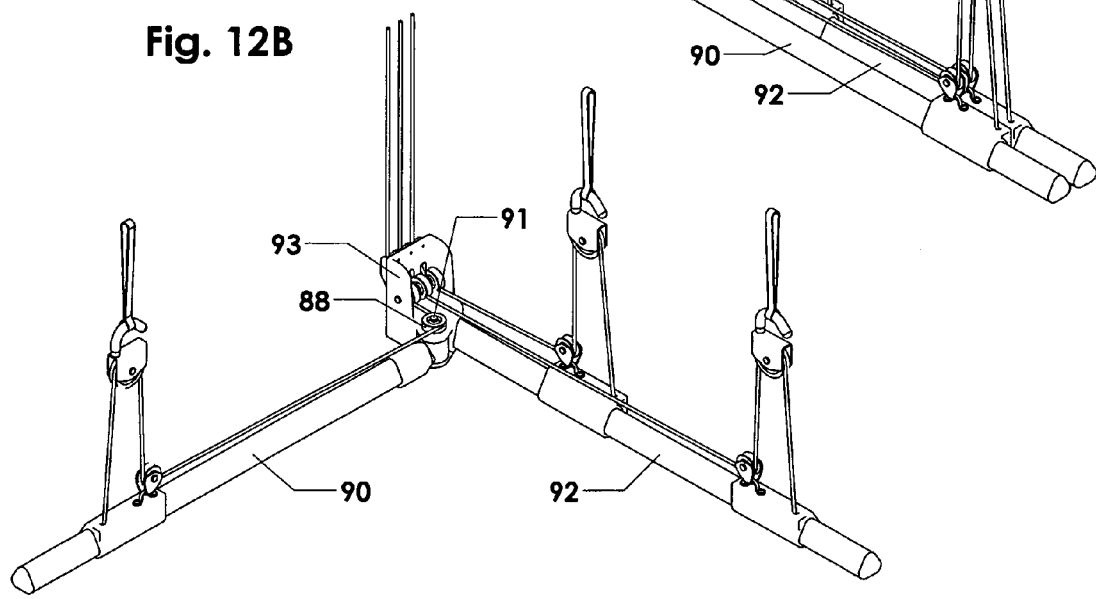
Figure 12C:
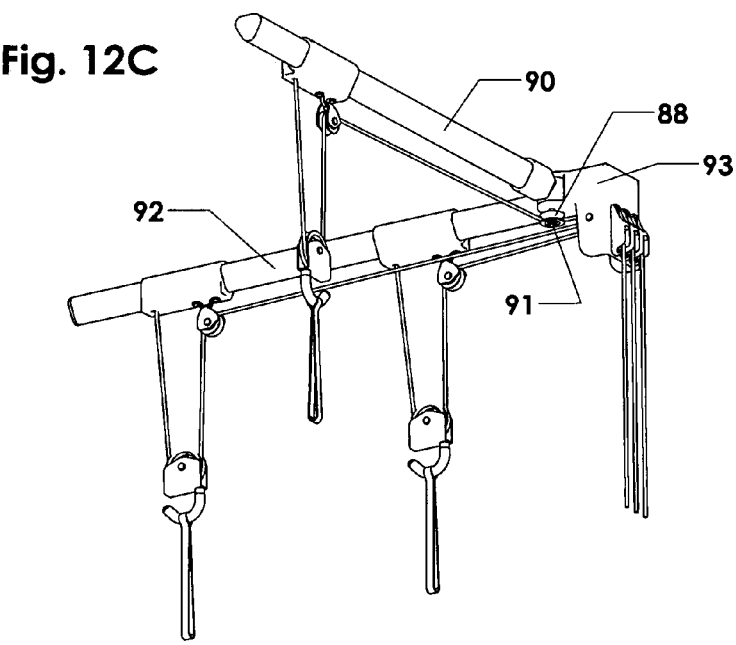
Figure 13A:
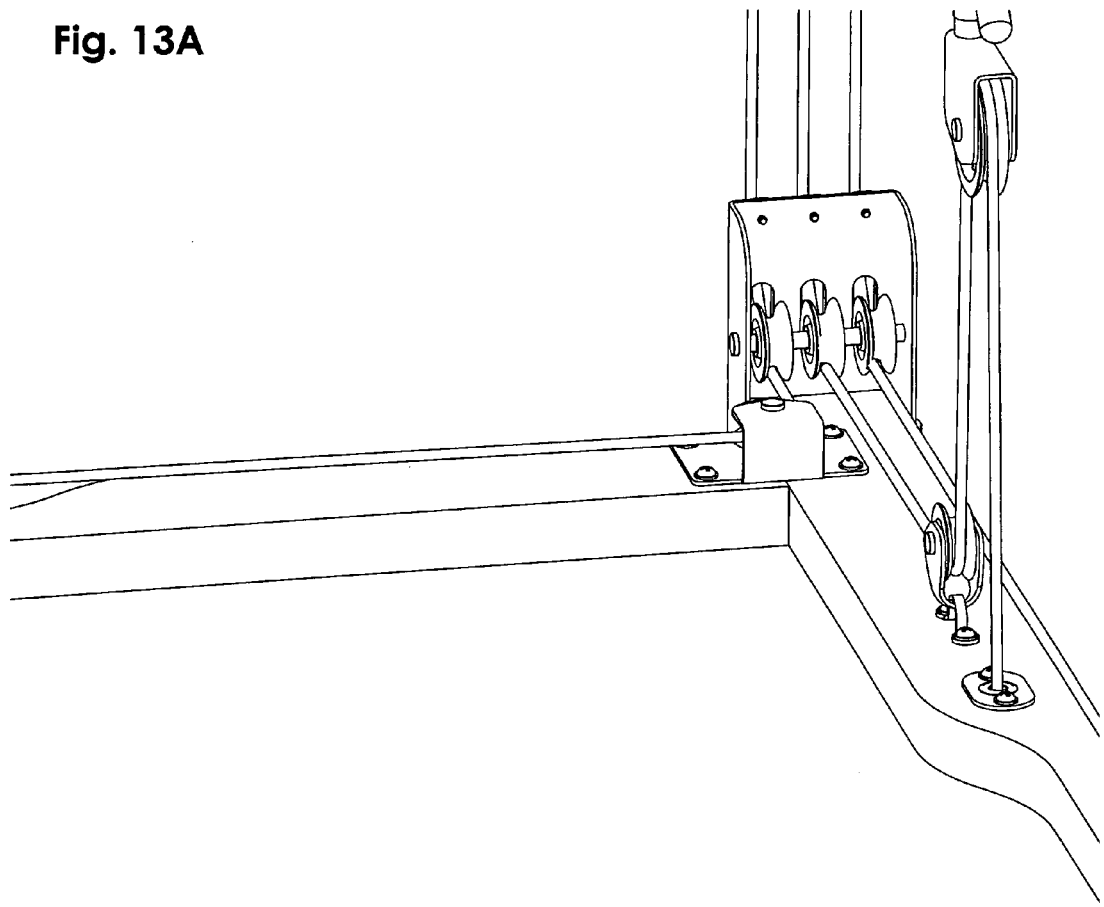
FIGS. 13A and 13B show partial views of a storage hoist with cleat rope locking devices and a redirect pulley.
Figure 13B:
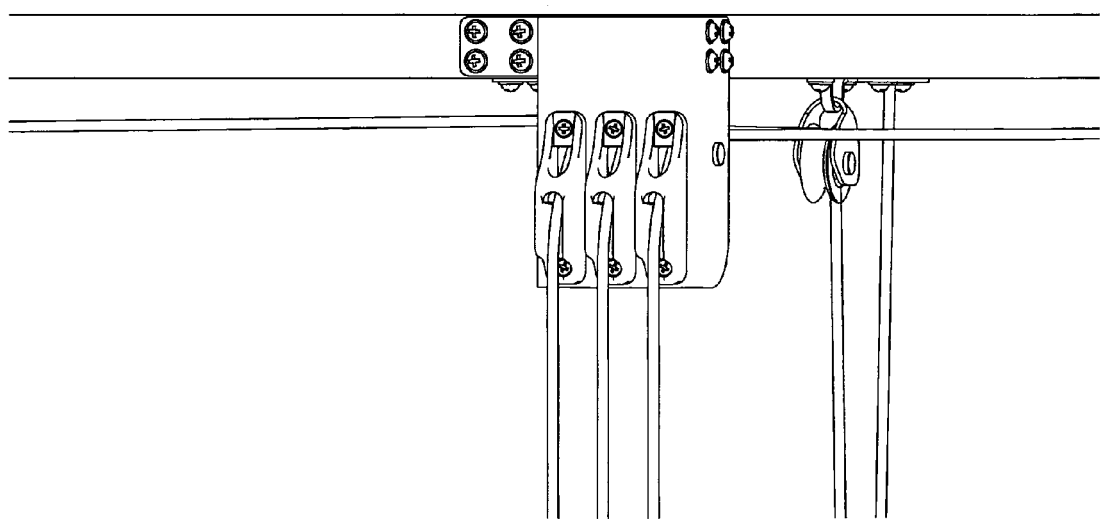

FIGS. 10A, 10B, 11A, 11B, 12A, 12B, 12C, 14A, 14B, 15A, 15B, 16A, 16B—Alternative Embodiments An alternative embodiment is shown in FIGS. 12A, 12B, and 12C. This embodiment comprises elongated structural members 90 and 92 consisting of tubular aluminum, to which a plurality of molded plastic components are mounted. Elongated structural member 90 is pivotably connected to elongated structural member 92 to allow the fully assembled storage hoist to be collapsed and efficiently packaged (FIG. 12A). A single molded component 93 provides similar functionality to rope lock assembly 34 and redirect pulley 35 of the preferred embodiment. The pin 91 on which the pulley wheel 88 is mounted also serves as an axis on which elongated structural member 90 pivots with respect to elongated member 92.

Figure 14A:
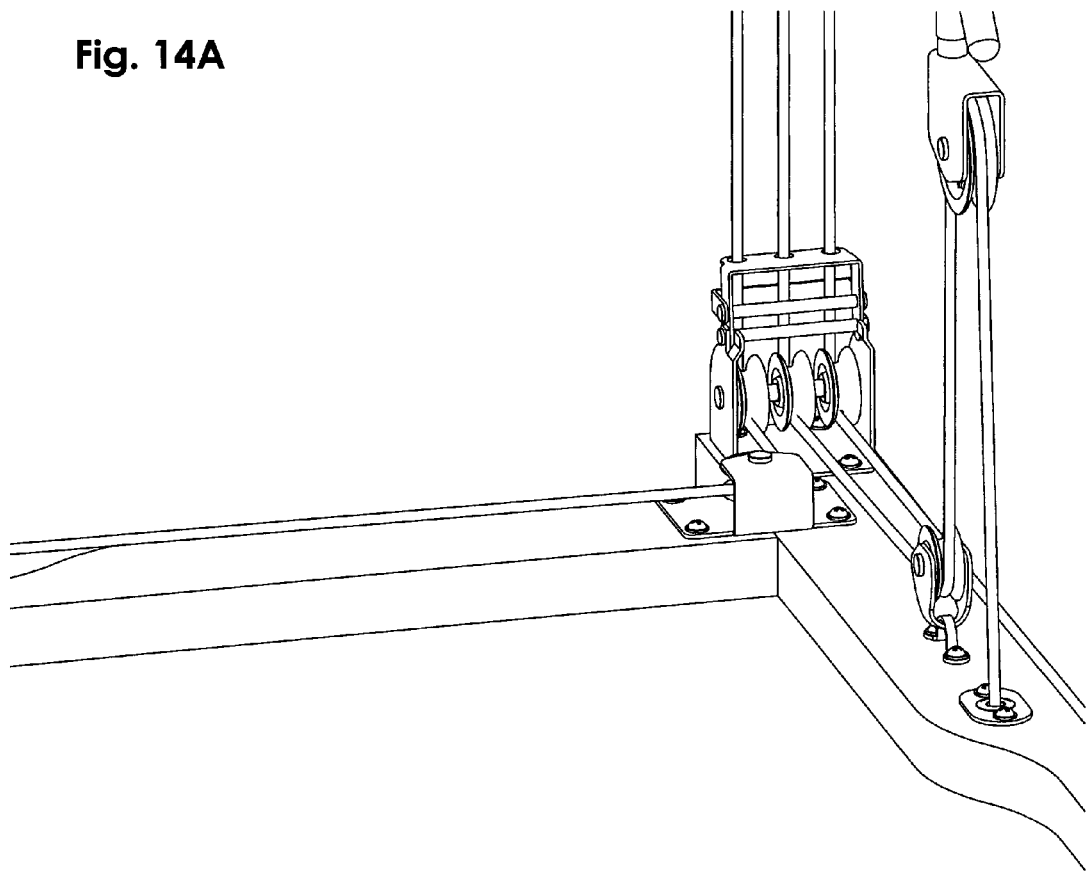
FIGS. 14A and 14B show partial views of a storage hoist with a triple-rope linkage rope locking device and a redirect pulley.
Figure 14B:
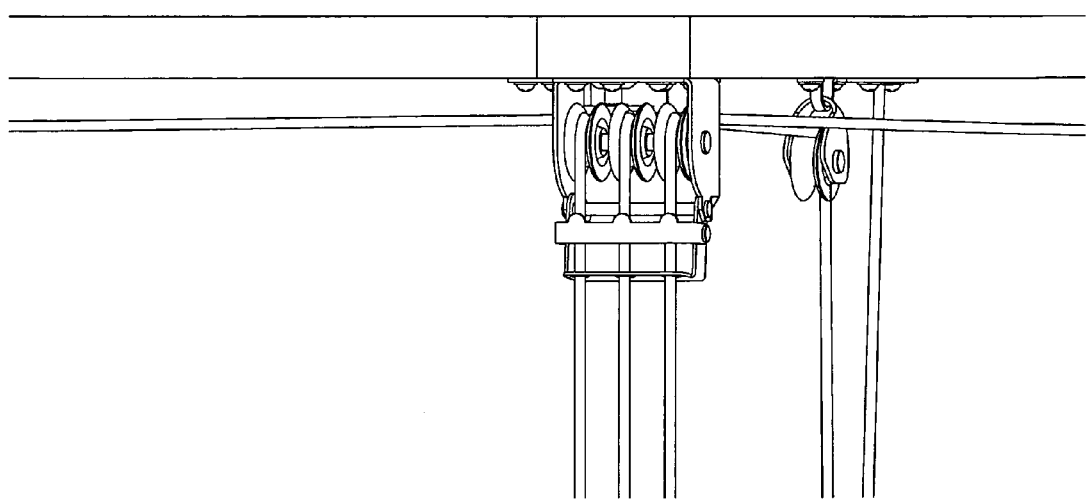
Figure 15A:
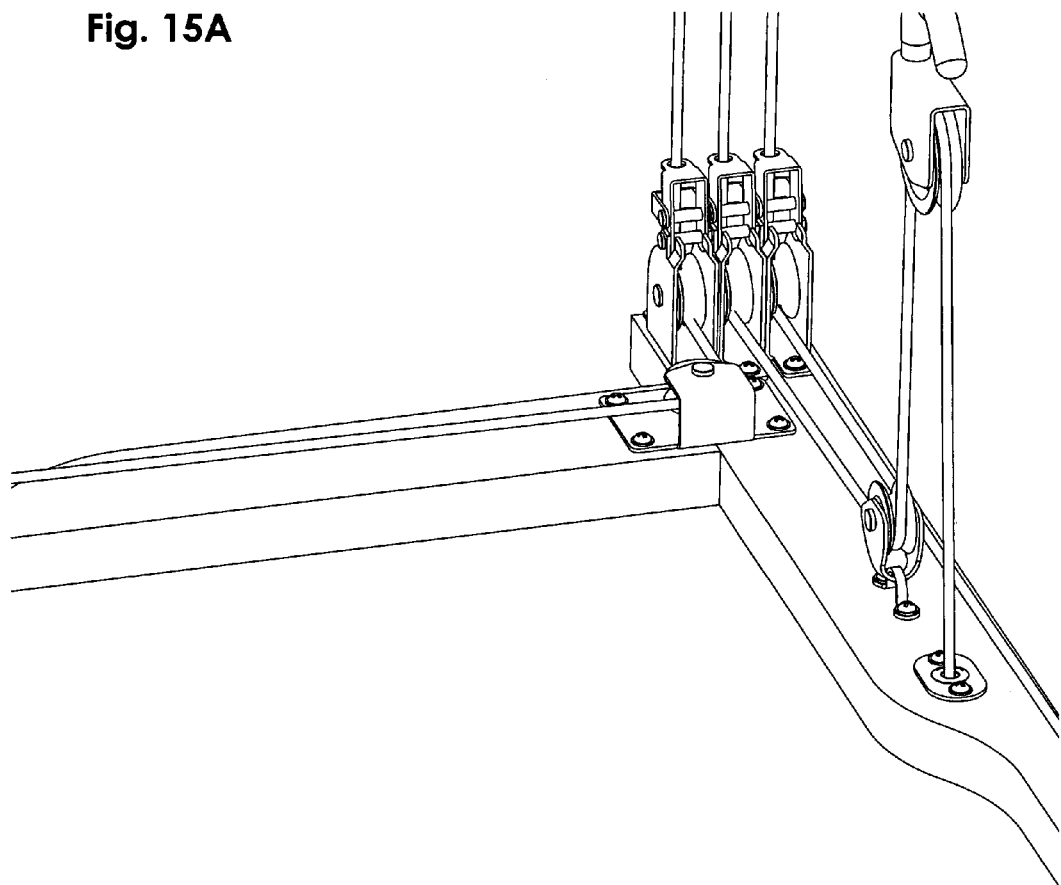
FIGS. 15A and 15B show partial views of a storage hoist with single-rope linkage rope locking devices and a redirect pulley.
Figure 15B:
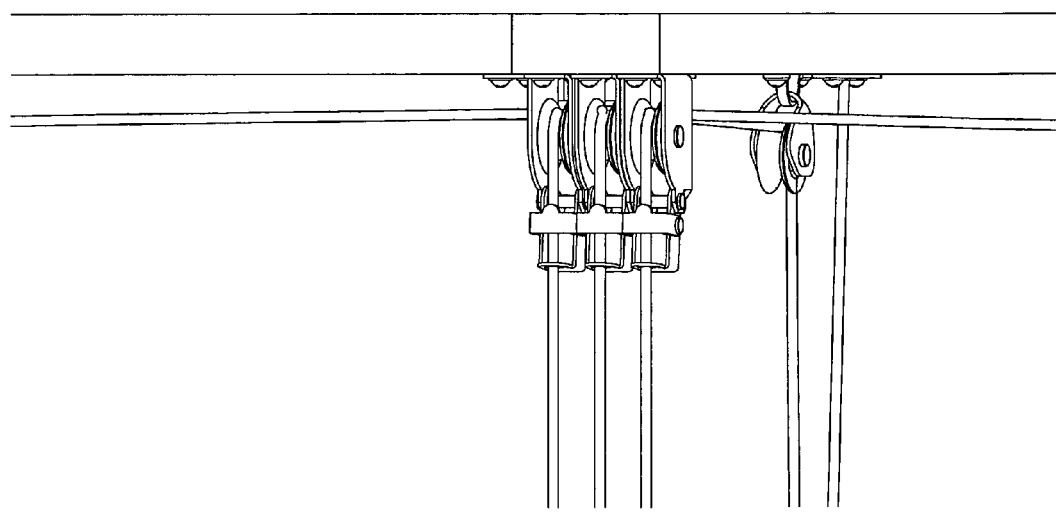
Figure 16A:
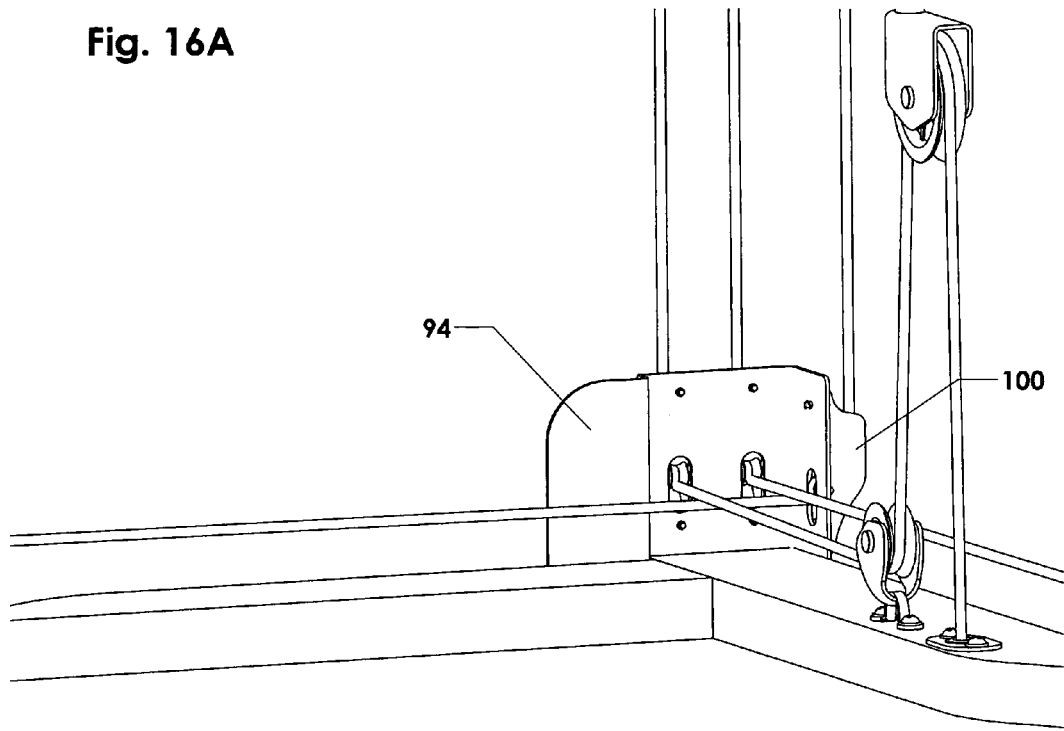
FIGS. 16A and 16B show partial views of a storage hoist with cleat rope locking devices comprising pins and pulley wheels.
Figure 16B:
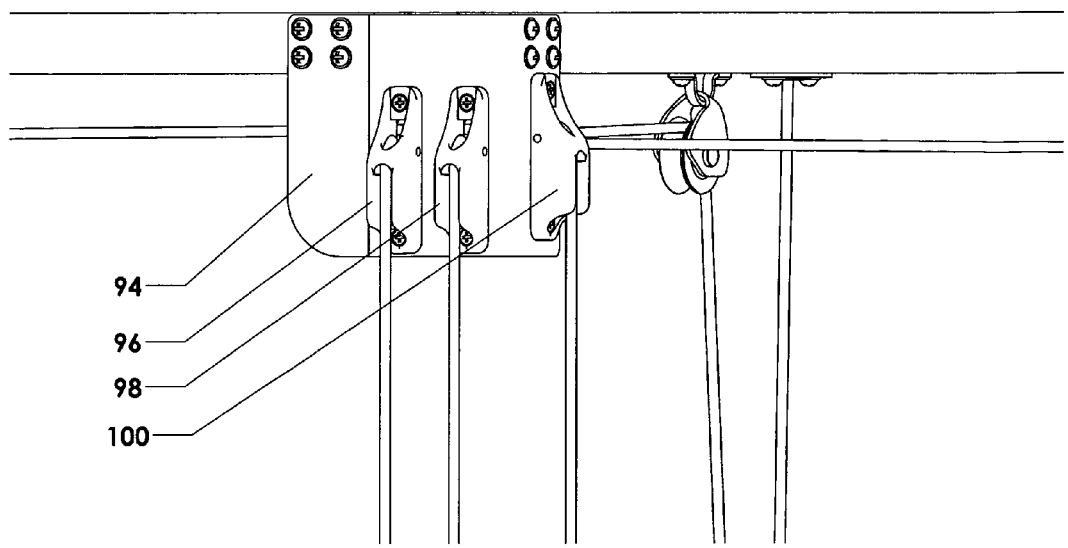

There are various possibilities with regard to the rope lock assembly and rope locking devices. FIGS. 14A and 14B show a sheet metal linkage that accepts all three ropes into a single linkage rope locking mechanism. FIGS. 15A and 15B show three independent sheet metal linkage type rope locks, each accepting a single rope into each linkage rope locking mechanism. There also exists a possibility to eliminate the redirect pulley; FIGS. 16A and 16B show a storage hoist in which one cleat rope locking device 100 is installed on a surface of rope lock assembly 94 substantially perpendicular to the surface on which the two remaining cleat rope locking devices 96 and 98 are installed. Instead of incorporating two perpendicular pins within the rope lock assembly 94, pins and small pulley wheels are incorporated into each cleat rope locking device. The cleat rope locking devices 96, 98 and 100 used in this embodiment are the CL203W/S2 available from Clamcleats Limited of Welwyn Garden City, England.

Figure 10A:
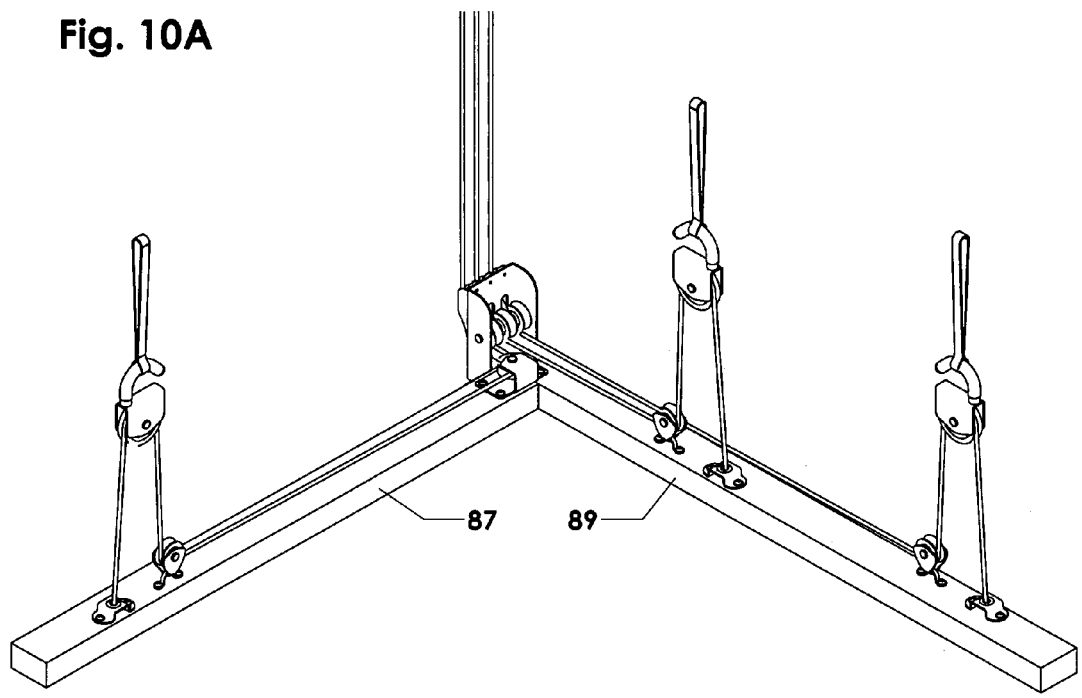
FIGS. 10A and 10B show a storage hoist with elongated structural members consisting of dimensional lumber.
Figure 10B:
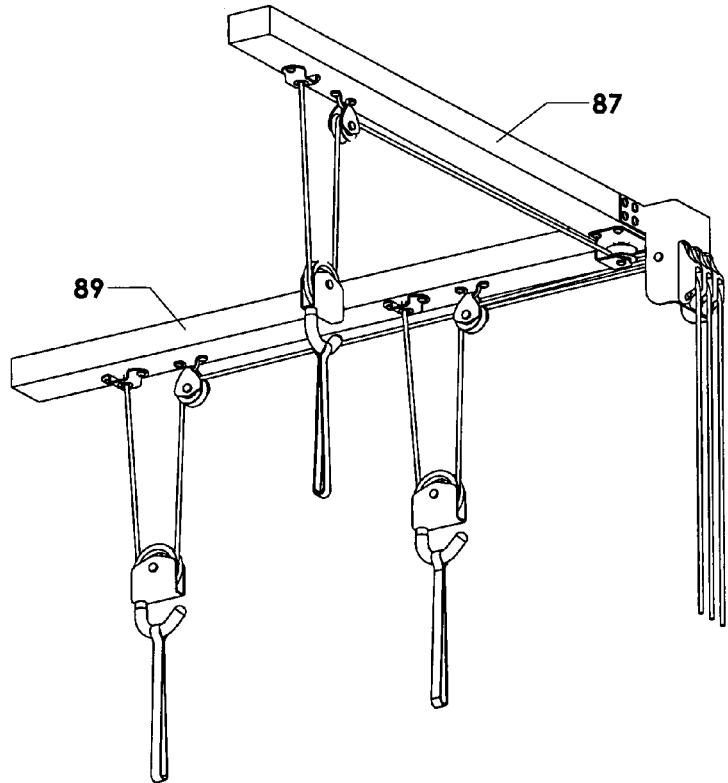
Figure 11A:
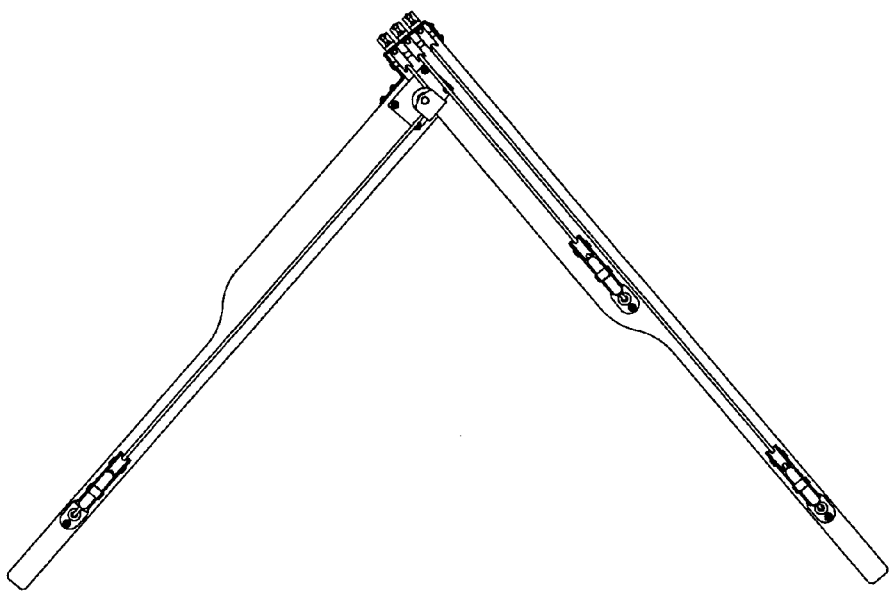
FIGS. 11A and 11B show storage hoists with elongated structural members joined at an acute angle and an obtuse angle.
Figure 11B:
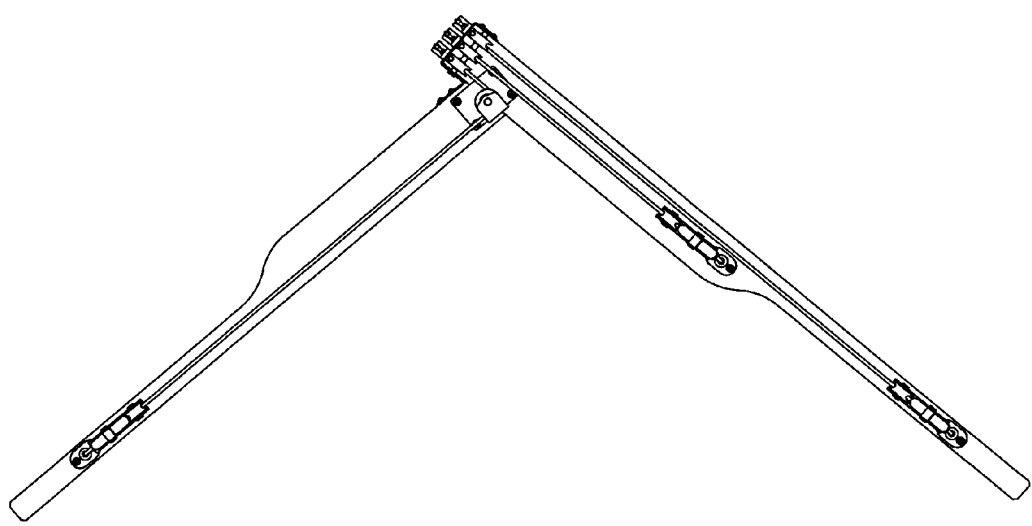

There also exists a possibility for elongated structural members 87 and 89 to consist of dimensional lumber, whereby the storage hoist may be marketed in incomplete form, comprising all necessary components except elongated structural members (FIGS. 10A and 10B).

Advantages

From the description above, a number of advantages of my ceiling-mounted bicycle storage hoist become evident:

(a) The storage of a bicycle in a horizontal position in close proximity to the ceiling makes use of space in a room that would otherwise remain underutilized.

(b) The ability to install the storage hoist on a variety of ceiling structures such as concrete ceilings, or wooden joist ceilings with joist spacings of 305 mm, 406 mm, 488 mm or 610 mm without the need for additional materials such as wooden boards to be applied to the ceiling, increases the marketability of this device to customers who demand simplicity of installation and a clean overall aesthetic.

(c) The ability to install the storage hoist in any one of two possible orientations (FIGS. 3A to 3H) on a wooden joist ceiling with joist spacings of 305 mm, 406 mm, 488 mm or 610 mm, expands the range of installation of this device.

(d) The elongated structural members of the storage hoist are arranged substantially perpendicular to each other in a V-like shape, allowing the storage hoist to satisfy (b) and (c), while employing relatively short elongated structural members.

(e) The ability to install the storage hoist anywhere in a room that a ceiling structure allows because no component must be installed on or nearby a wall.

(f) The use of rope and pulley systems with mechanical advantage of 2 and cleat rope locking devices provides for a safe, easy to operate storage system.

(g) The storage hoist comprises three separate rope and pulley systems for maximum control of the attitude of a bicycle so it may be stored in close proximity to the ceiling;

(h) The storage hoist is able to store a wide range of bicycle shapes and sizes by incorporating pulleys that are able to accommodate acute rope angles;

Accordingly, the reader will see the storage device of this invention may be installed easily on many common ceiling structures without the use of additional structures such as wooden boards. In addition, the user may choose one of two possible orientations to install the storage hoist with respect to a wooden joist ceiling. Furthermore, the storage hoist is easy to operate and safe due to rope and pulley mechanisms with cleat rope locking devices. Furthermore, the storage hoist is able to store many different sizes and shapes of bicycle in close proximity to a ceiling due to independent rope and pulley mechanisms and pulleys designed to accommodate acute rope angles.

Although the description above contains many specifications, these should not be construed as limiting the scope of the invention but as merely providing illustrations of some of the presently preferred embodiments of this invention. For example, the elongated structural members of the storage hoist may be joined together with brackets or a hinge; the elongated structural members of the storage hoist may be joined at an acute or obtuse angle (FIGS. 11A and 11B); etc.

Thus the scope of the invention should be determined by the appended claims and their legal equivalents, rather than by the examples given.

I claim:

1. A ceiling-mounted bicycle storage hoist comprising: a pair of elongated structural members attachable to a ceiling, each said elongated structural member having a first end and a second end, the first end of said first elongated structural member being connected substantially near the first end of said second elongated structural member, said first elongated structural member arranged substantially perpendicular to said second elongated structural member;

a first rope and pulley system comprising a first and second fixed pulley, each said fixed pulley having a horizontal axis of rotation, said first fixed pulley attached substantially near the first end of said first elongated structural member, said second fixed pulley attached substantially near the second end of said first elongated structural member;

a second rope and pulley system comprising a third and fourth fixed pulley, each said fixed pulley having a horizontal axis of rotation, said third fixed pulley attached substantially near the first end of said first elongated structural member, said fourth fixed pulley attached substantially near the midpoint between the first and second ends of said first elongated structural member;

a third rope and pulley system comprising a fifth, sixth, and seventh fixed pulley, said fifth and seventh fixed pulley having a horizontal axis of rotation, said sixth fixed pulley having a vertical axis of rotation, said fifth fixed pulley attached substantially near the first end of said first elongated structural member, said sixth fixed pulley attached substantially near the first end of said second elongated structural member, said seventh fixed pulley attached substantially near the second end of said second elongated structural member, whereby said first rope and pulley system may be connected to a seat stay of a bicycle, said second rope and pulley system may be connected to a seat tube of said bicycle, and said third rope and pulley system may be connected to a fork of said bicycle, so that said bicycle may be hoisted and stored in a horizontal orientation.

2. The bicycle storage hoist of claim 1 wherein said first elongated structural member is pivotably connected to said second elongated structural member.

* * * * *